United States Patent
Manuel et al.

(10) Patent No.: US 10,696,512 B2
(45) Date of Patent: Jun. 30, 2020

(54) FILAMENT ACCUMULATOR OR TENSIONING ASSEMBLY

(71) Applicant: Arevo, Inc., Santa Clara, CA (US)

(72) Inventors: Steven George Manuel, San Mateo, CA (US); Erik Sunden, San Francisco, CA (US)

(73) Assignee: Arevo, Inc., Milpitas, CA (US)

( * ) Notice: Subject to any disclaimer, the term of this patent is extended or adjusted under 35 U.S.C. 154(b) by 99 days.

(21) Appl. No.: 16/023,210

(22) Filed: Jun. 29, 2018

(65) Prior Publication Data

US 2020/0002121 A1    Jan. 2, 2020

(51) Int. Cl.
*B65H 59/38* (2006.01)
*B29C 64/20* (2017.01)
*B29C 64/321* (2017.01)
*B33Y 30/00* (2015.01)

(52) U.S. Cl.
CPC ........... *B65H 59/387* (2013.01); *B29C 64/20* (2017.08); *B29C 64/321* (2017.08); *B33Y 30/00* (2014.12)

(58) Field of Classification Search
CPC ........ B65H 51/20; B65H 59/12; B33Y 30/00; B33Y 40/00; B29C 64/118; B29C 64/20; B29C 64/321; B29C 64/343
See application file for complete search history.

(56) References Cited

U.S. PATENT DOCUMENTS

| | | | | |
|---|---|---|---|---|
| 4,605,178 A * | 8/1986 | Bartzick | ................ | B65H 20/30 |
| | | | | 242/364.1 |
| 5,865,051 A * | 2/1999 | Otzen | ..................... | B21C 47/18 |
| | | | | 226/137 |
| 6,474,583 B1 * | 11/2002 | Won | ........................ | B21B 41/00 |
| | | | | 242/364.1 |
| 6,588,695 B1 * | 7/2003 | Knoch | .................... | B65H 49/34 |
| | | | | 242/418.1 |
| 7,398,903 B2 * | 7/2008 | Ulrich | .................... | B65H 51/20 |
| | | | | 226/24 |
| 2005/0051588 A1 * | 3/2005 | Ulrich | .................... | B65H 51/20 |
| | | | | 226/24 |
| 2019/0224772 A1 * | 7/2019 | Kawai | ................... | B23K 9/0953 |

FOREIGN PATENT DOCUMENTS

| | | | | |
|---|---|---|---|---|
| DE | 3120721 A1 * | 12/1982 | ............. | B65H 51/20 |
| DE | 4320405 A1 * | 12/1994 | ........... | B23K 26/211 |

OTHER PUBLICATIONS

Machine Translation of DE 43 20 405 A1, Dec. 22, 1994. (Year: 1994).*

* cited by examiner

*Primary Examiner* — William E Dondero
(74) *Attorney, Agent, or Firm* — Myers Wolin, LLC; Harris A. Wolin; Daniel Jacob Gross

(57) ABSTRACT

A filament accumulator assembly is provided containing a filament inlet for receiving a continuous filament from the filament source and a filament outlet for receiving the continuous filament from the filament inlet, the continuous filament forming a filament loop between the filament exiting the filament inlet and entering the filament outlet. The filament accumulator assembly further comprises a filament track defining at least part of an inner boundary and an outer boundary of a circuitous filament route between the filament inlet and the filament outlet, and the filament loop is bound by the filament track. The filament loop has a diameter that varies across a range of potential diameters within the filament track.

12 Claims, 8 Drawing Sheets

FILAMENT ACCUMULATOR OR TENSIONING ASSEMBLY

FIELD OF THE INVENTION

The present invention relates to additive manufacturing of three-dimensional articles in general, and, more particularly, to an assembly for decoupling a speed or tension of a filament provided for use in additive manufacturing processes from a speed or tension of the filament at a filament source.

BACKGROUND

In general, there are two complementary approaches to manufacturing an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "three-dimensional (3D) printing"—is the subject of intense research and development because it enables objects with complex geometries to be manufactured without molds or dies, although molds or dies may be used to support the manufacturing process in some cases. Furthermore, 3D printing enables the mass customization of objects with different dimensions and characteristics.

In at least one 3D printing technique, the object is built by providing a thermoplastic filament to a deposition head on a robotic arm. The thermoplastic filament comprises a continuous tow of carbon fibers that is impregnated with thermoplastic. The deposition head heats and deposits the thermoplastic filament as one or more runs of material, via a roller. After it is deposited, each run quickly solidifies and fuses with the runs that it touches. The technique thereby builds a three-dimensional object from a mathematical model of the object.

In order to build the object to within the tolerances specified in the model, the deposition head must be continuously provided with the thermoplastic filament at a known tension, or at a minimal tension so that it can be drawn by the deposition head at a known speed. When tension is sufficiently reduced, a downstream system, such as the deposition head, is able to control the speed and tension of the filament directly, and the formation of uncontrolled loads in the filament is prevented. Further, if tension is not sufficiently reduced, upstream and downstream impedances compete to reduce predictability and create a variety of problems. For example, if the spool inertia is sufficiently great and the feed motor in the deposition head is sufficiently powerful, the filament could break, given a slight mismatch in spool and deposition feed rates. Alternatively, if a feed motor is insufficiently powerful, part quality could be reduced as tension in the filament is higher than expected and the achievable feed rate may be lower than what the deposition head's travel speed requires. Various other scenarios can also result in unpredictable interplay between components of the system, thereby reducing the quality of parts printed in such a system.

Accordingly, speed or tension at a filament deposition head should be decoupled from speed or tension or any other loads in an upstream system. Providing a known tension, such as a minimal tension, or a controllable speed results in predictable filament uptake by a deposition head, as well as known characteristics of the filament during deposition. The tension or speed must further be kept substantially constant, or controllable by the deposition head, regardless of variations in tension or speed of the filament as provided from a source. Such variations in the source may be due to inertia in a source material spool, a mismatch between the speed of a motor at source of the filament, such as a spool, with the speed at which the filament is drawn by the deposition head, or friction at some point within the system. Because such a tension or speed mismatch may result in insufficient or excess filament being provided to the system, the filament must be accumulated and placed somewhere. The accumulated reserve material must be kept in a location where there is a safe margin of additional space so that excess material coming from the source or the deposition head can be temporarily stored in the accumulator.

A filament source may ideally provide filament to be drawn by a deposition head without substantial tension, in which case the deposition head can control all downstream properties of the filament, including speed and tension. This may be, for example, by manually feeding filament to the deposition head or by manually unspooling filament and providing it to the deposition head from a pile or the like. However, this dramatically limits the volume of filament that can be provided, or the speed at which the process can be implemented. Typically, filament is provided on a spool, and the spool itself may generate friction or inertia that results in varying speeds or tensions in the line. This may be addressed by providing a filament source that may be consistently driven with a motor such that it matches the speed at which filament is drawn by a deposition head. However, even in such an embodiment, mismatches are possible where there are sudden changes at the deposition head, such as a cut after a run of material, or where a change of speed occurs at different rates, such as due to inertia at the filament source.

Traditional applications that require a thread or filament provided at a known tension, or at a controllable or known rate despite variations in a source, in other contexts may rely on a dancer tension control system. Such a dancer may be an extra roller that is used to vary the length of a path between two points in order to account for variations in a source tension or a speed mismatch by taking up excess thread or filament. Such a dancer isn't practical when the source thread or filament is relatively stiff, since it would require substantial baseline tensioning and a large amount of space. Further, because of the dimensions, inertias and tensions required at the dancer roller, such a system for a stiff filament may require active control of the roller.

What is needed is a system for managing tension or speed of a filament provided to a deposition head for use in 3D printing without the use of a dancer roller. There is a further need for such a system that manages takeup of excess filament and is relatively easy to load without at least some of the disadvantages in the prior art.

SUMMARY

The present invention enables a deposition head in an additive manufacturing system to draw a thermoplastic filament from a source at a controlled speed for application to an object being manufactured. In particular, the filament accumulator decouples an inlet speed or tension in a filament based on an upstream system from an outlet speed of the filament provided to a downstream system.

A filament accumulator assembly, such as those described herein, absorbs a speed mismatch between filament provided from a filament source and filament used at and by a filament deposition head. The filament accumulator comprises a filament inlet for receiving a continuous filament from the filament source and a filament outlet for receiving the continuous filament from the filament inlet, the continuous filament forming a filament loop between the filament exiting the filament inlet and entering the filament outlet.

The filament accumulator assembly further comprises a filament track defining at least part of an inner boundary and an outer boundary of a circuitous filament route between the filament inlet and the filament outlet, and the filament loop is bound by the filament track. The filament loop has a diameter that varies across a range of potential diameters within the filament track.

In use, the filament deposition head draws the continuous filament from the filament outlet at a first speed and the filament inlet receives the continuous filament from the filament source at a second speed. Where there is a mismatch between the first speed and the second speed, the diameter of the filament loop may change to account for the mismatch. Such a mismatch may be due to a first speed unrelated to a second speed, thereby constantly requiring adjustment, or it may be due to a first speed imperfectly matched to a second speed. The first speed may be controlled by the deposition head.

Where such a mismatch continues over time, the filament loop may continue to grow larger or smaller until it encounters the outer or inner boundary of the filament accumulator. The inner or outer boundary may therefore contain a limit switch indicating to a controller that the filament accumulator is at its limit corresponding to its minimum or maximum potential diameter.

Activation of an inner limit switch sends a signal to the filament deposition head to stop drawing filament from the filament outlet, or it may send a signal to start or increase a speed of a motor at the filament inlet or at the filament source, thereby increasing a speed at which the continuous filament is received.

Activation of an outer limit switch may send a signal to slow down or stop a motor at the filament source. In some embodiments, the outer limit switch may be removable from the filament track, so as not to obstruct the continuous filament during loading of the filament loop.

The filament accumulator may further comprise a housing, and an interior of the housing may define at least part of the filament track. The interior of the housing may further comprise a guiding path, which may be removable, that directs the continuous filament past the outer limit switch during loading of the filament. In some embodiments, portions of the filament track may comprise rollers in order to reduce friction in the filament, particularly during loading of the filament.

The filament deposition head may be mounted on a robot wrist, and the filament track may encircle the robotic wrist. Such a filament track may be circular, or may approximate a circle.

In some embodiments, the filament track may define the inner boundary and the outer boundary of the circuitous filament route at one point along the route, or at a small number of points along the route, and the circuitous filament route may then be further defined at the filament inlet and the filament outlet. In such an embodiment, the inner and outer boundary may be located at the one point relative to the inlet or the outlet using a support.

In some embodiments, the filament accumulator may be paired with one or more additional filament accumulators in order to account for a larger, or more continuous, speed mismatch that therefore requires additional slack be accounted for. In such an embodiment, the filament inlet of one filament accumulator may receive the continuous filament from the outlet of a second filament accumulator, the deposition head may draw the continuous filament from the filament outlet of the one filament accumulator, and the second filament accumulator may receive the continuous filament from a filament source. In such an embodiment, the filament accumulator may comprise an additional motor for regulating a speed between the first filament accumulator and the second filament accumulator.

DETAILED DESCRIPTION OF THE PREFERRED EMBODIMENTS

Figure 1:
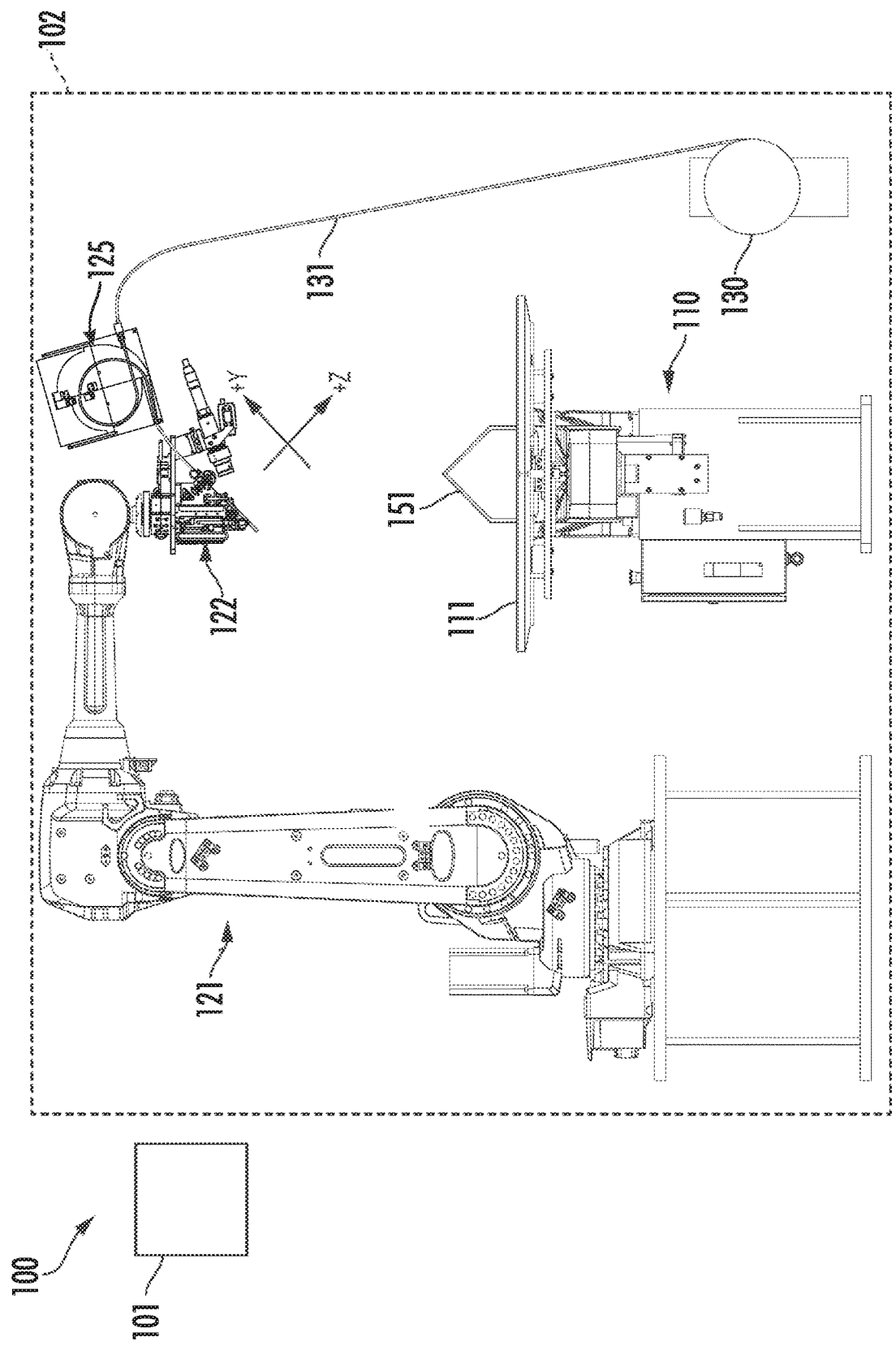
FIG. 1 depicts an illustration of the salient components of additive manufacturing system 100 in accordance with the illustrative embodiments of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The filament accumulator assemblies, sometimes referred to herein as filament tensioning, or detensioning, assemblies, of the illustrative embodiments are described in this specification in the context of providing thermoplastic filament to a deposition head in an additive manufacturing system at a known tension, at a known speed, or at a relatively low level of tension so that it can be drawn easily and predictably by the deposition head. As those who are skilled in the art will appreciate, however, after reading this specification, the disclosed filament accumulator assembly can be used in various other applications, and with either filaments or other slender threadlike objects or fibers. For example and without limitation, any heating or welding process using a filament with a known stiffness and requiring a substantially consistent tension in or speed of the filament can benefit from the assembly disclosed.

FIG. 1 depicts an illustration of the salient components of additive manufacturing system 100 in accordance with the illustrative embodiment of the present invention. Additive manufacturing system 100 comprises: controller 101, build chamber 102, turntable 110, deposition platform 111, robot 121, deposition head 122, filament accumulator assembly 125, filament source 130, and thermoplastic filament 131. A purpose of manufacturing system 100 is to manufacture object 151, which is an article of manufacture or an apparatus.

Controller 101 comprises the hardware and software necessary to direct build chamber 102, robot 121, deposition head 122, and turntable 110, in order to manufacture object 151. The controller also directs at least some of the components that are part of deposition head 122, and may control components of the accumulator assembly described below. Controller 101 comprises computer-aided design/computer-aided manufacturing (CAD/CAM) functionality in order to control the aforementioned components. It will be clear to those skilled in the art, after reading this disclosure, how to make and use controller 101.

Build chamber 102 may be a thermally-insulated, temperature-controlled environment in which object 151 is manufactured. It will be clear to those skilled in art how to make and use build chamber 102, and it will be understood that such a thermally insulated build chamber is not critical for manufacturing the object 151.

Turntable 110 comprises a motor, which may be a stepper motor, under the control of controller 101 that is capable of rotating platform 111 (and, consequently object 151) around an axis of rotation. In particular, turntable 110 is capable of:
  i. rotating platform 111 clockwise around the axis of rotation from any angle to any angle, and
  ii. rotating platform 111 counter-clockwise around the axis of rotation from any angle to any angle, and
  iii. rotating platform 111 at any rate, and
  iv. maintaining (statically) the position of platform 111 at any angle.

In some embodiments of the present invention, turntable 110 is further capable of being positioned in general (i.e., not being limited to rotation around the aforementioned axis), under the control of controller 101, and accordingly is sometimes referred to as a "build plate positioner." It will be clear to those skilled in the art how to make and use turntable 110.

Platform 111 comprises hardware on which object 151 is manufactured. Platform 111 is configured to receive heated filament deposited by deposition head 122. In some embodiments, platform 111 is referred to as a "build plate."

As those who are skilled in the art will appreciate, platform 111 need not be coupled to a turntable, in order for it to receive the heated filament. In any event, it will be clear to those skilled in the art how to make and use platform 111.

Robot 121 may be capable of depositing a run of material from any three-dimensional coordinate in build chamber 102 to any other three-dimensional coordinate in build chamber 102 with deposition head 122 at any approach angle. To this end, robot 121 comprises a multi-axis (e.g., six-axis, seven-axis, etc.), mechanical arm under the control of controller 101. A non-limiting example of robot 121 is the IRB 4600 robot offered by ABB. It will be clear to those skilled in the art how to make and use robot 121, and that for many purposes, a robotic system with narrower capabilities and additional constraints may still benefit from the embodiments of the filament accumulator or detensioning device described herein.

Deposition head 122 comprises hardware that is under the control of controller 101 and that deposits filament 131, which may partially or wholly contain one or more fiber strands. Deposition head 122 is an example of an "end effector" in relation to robot 121, being attached to robot 121 at the robot's wrist.

Thermoplastic filament 131 comprises a cylindrical towpreg of continuous 12K carbon fiber that is impregnated with a thermoplastic and is supplied from filament source 130 (e.g., a spool, etc.) by way of tensioning assembly 125. In some embodiments, the filament source 130 may be a spool having a motor for rotating the spool and providing the thermoplastic filament 131 to the accumulator assembly 125. Further, the filament source may be humidity controlled in order to provide a dry environment, or some other ideal environment for the spool of filament. Further, in some embodiments, there may also be another motor near the spool 130 which exerts force directly on the filament 131 to achieve finer feed control. These multiple motors may be provided, along with more traditional tension or uptake control systems, such as a dancer. This may be provided in order to improve the motor feed of filament to the filament accumulator and to prevent the spool of filament from unfurling when there is insufficient tension on the filament at the spool. This pairing of multiple motors and a dancer may allow for more responsive feed control from the spool. However, even with a more responsive feed control, speed mismatches may occur.

In some alternative embodiments, filament 131 is impregnated with something other than, or in addition to, a thermoplastic. It will be clear to those skilled in the art, after reading this disclosure, how to make and use alternative embodiments of the present invention in which thermoplastic filament 131 has a different fiber composition, such as one described in U.S. patent application Ser. No. 14/184,010, which is incorporated by reference herein.

Although not shown, in some embodiments, the path that the filament 131 takes from the filament source 130 to the filament accumulator and the path it takes from the filament accumulator to the deposition head may be enclosed in tubing. Such tubing may be used to control the environment within which the filament 131 is provided, such as to shield the filament from ambient moisture, which might otherwise be absorbed by the filament. Such tubing may also be used to prevent motion of the robot 121 from impacting the filament directly. In such a scenario, the motion-related loads may be borne by the tubing itself, keeping the filament path length fixed. Further, such tubing may be oversized and may be made of a slippery material so as to reduce any friction between such tubing and the filament 131.

Thermoplastic filament 131 is deposited as a "run of material" onto object 151 or platform 111, or both. For purposes of clarity, filament 131 is depicted in FIG. 1 as being separate from object 151. The particular shape of object 151 as depicted has been selected for pedagogical purposes; however, additive manufacturing system 100 is capable of building any of a variety of objects.

Figure 2:
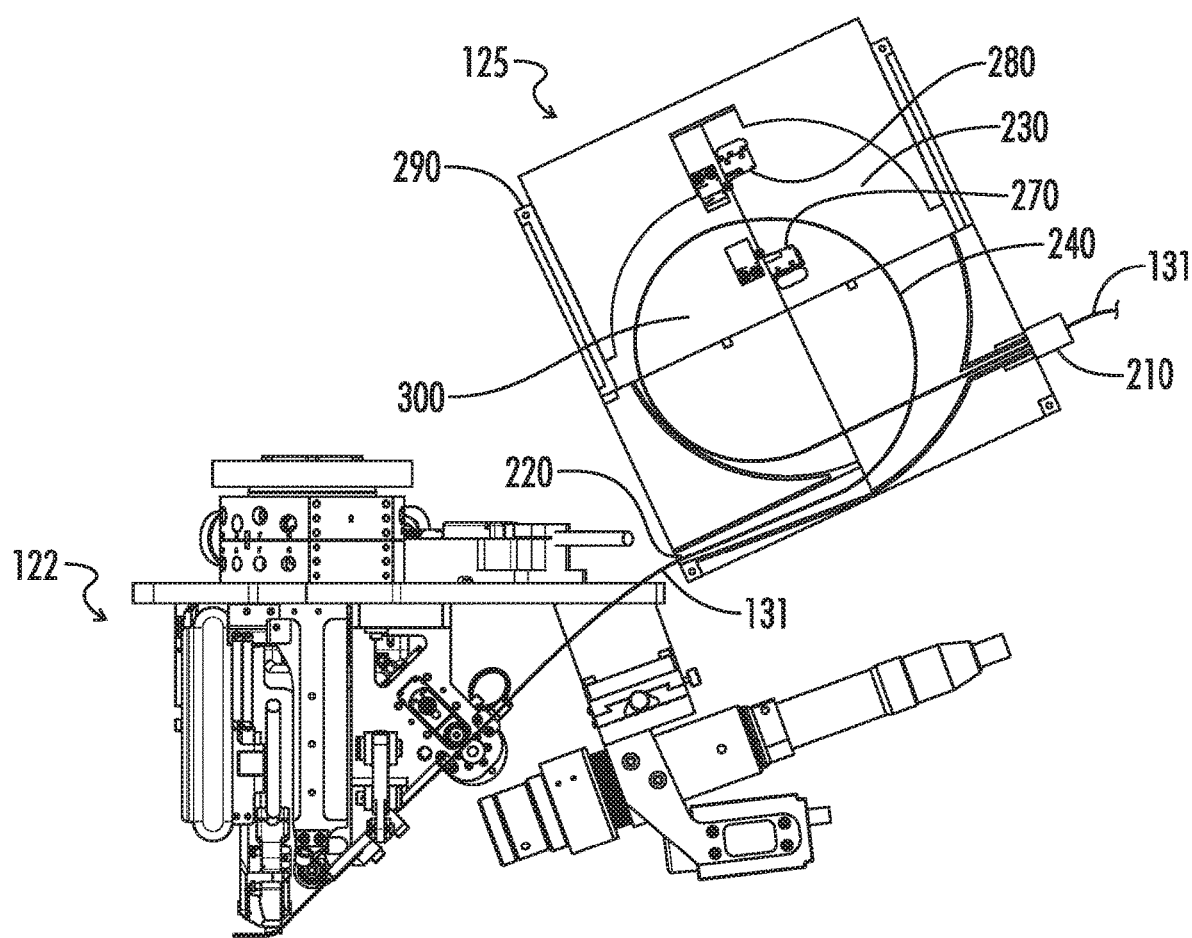
FIG. 2 depicts a filament accumulator assembly 125 for use with the additive manufacturing system 100 of FIG. 1.
Figure 3A:
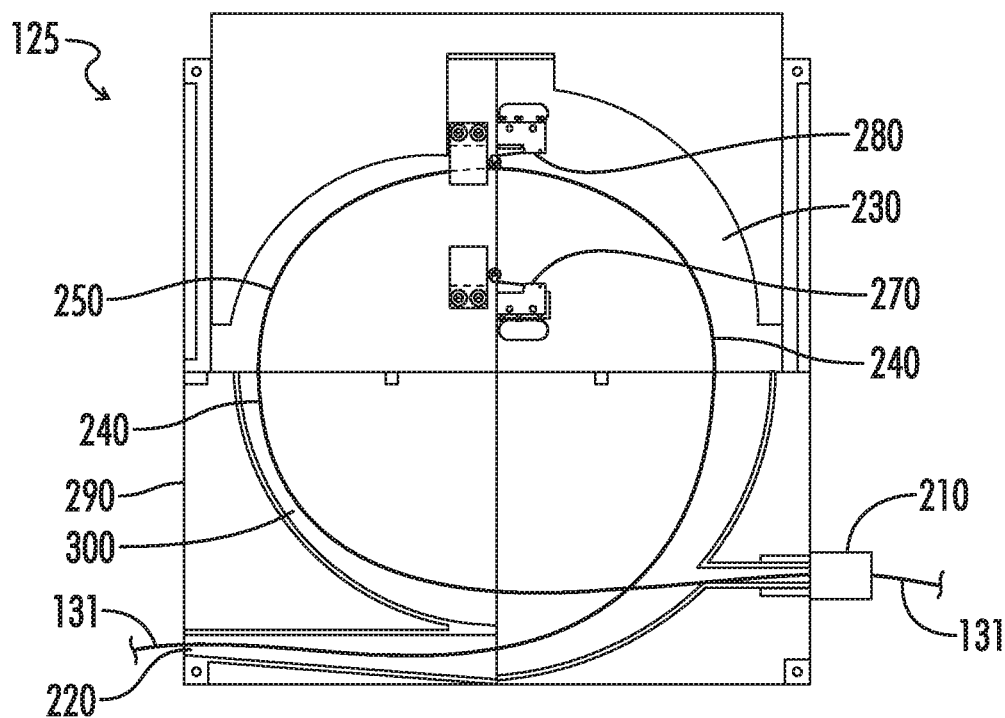
FIGS. 3A and 3B depict the filament accumulator assembly 125 in a first and second use case respectively.
Figure 3B:
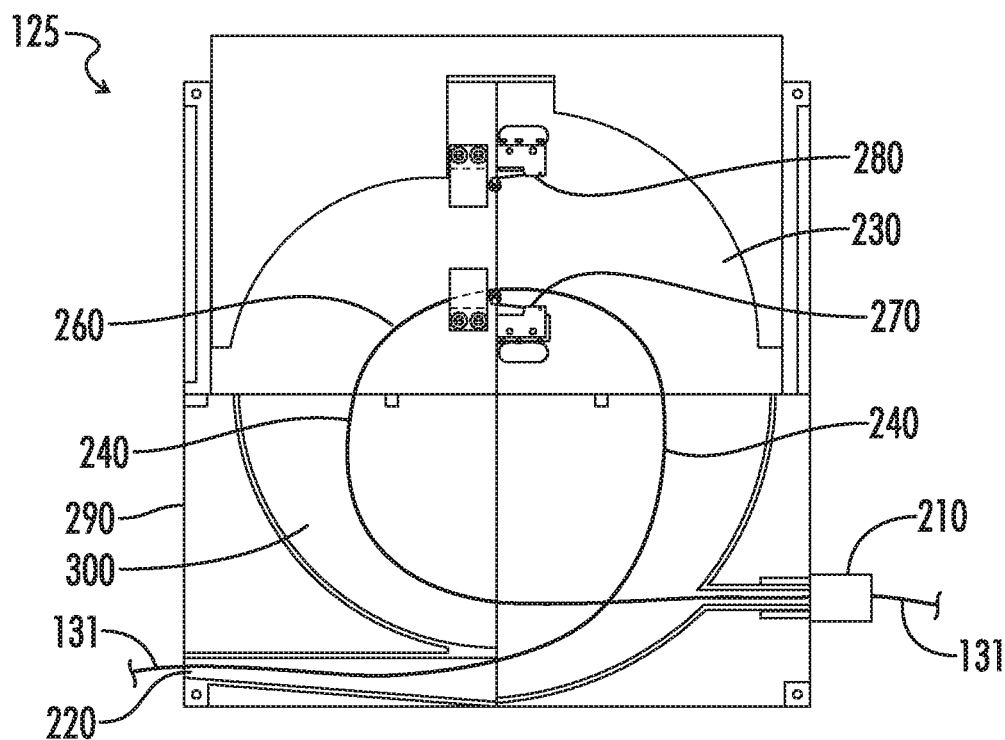
Figure 3C:
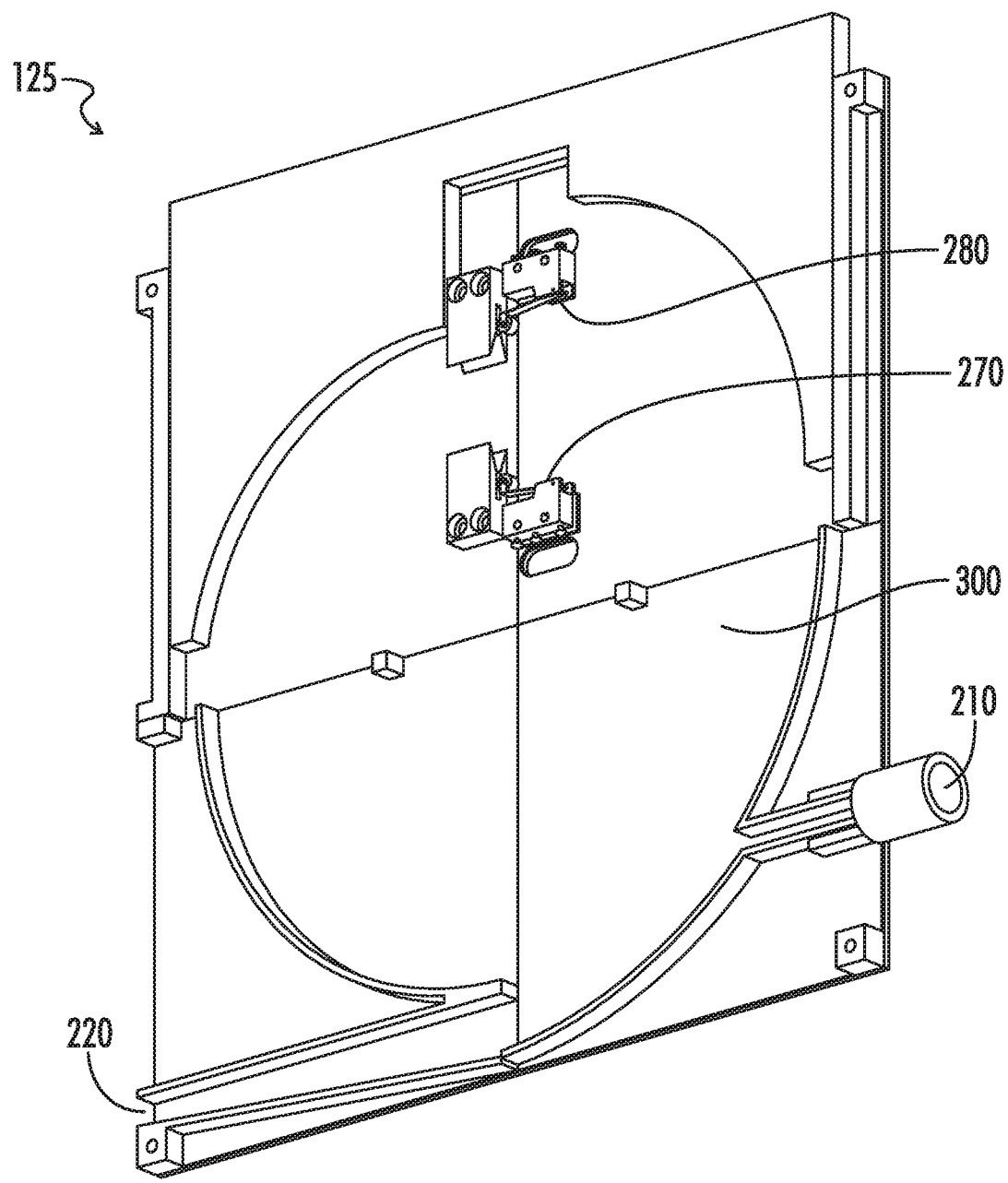
FIG. 3C depicts a perspective view of the filament accumulator assembly 125.

FIG. 2 depicts a filament accumulator assembly 125 for use with the additive manufacturing system 100 of FIG. 1, and FIGS. 3A and 3B depict the filament accumulator assembly 125 in a first and second use case respectively. FIG. 3C depicts a perspective view of the filament accumulator assembly 125.

As shown, the accumulator assembly 125 is located with respect to the deposition head 122 and provides a continuous thermoplastic filament 131, referred to occasionally herein as a continuous filament or just a filament, at a substantially consistent tension or speed or at a reduced tension, to be deposited by the deposition head 125. Where the assembly 125 provides filament at a known tension, the tension may be maintained at a minimal level so that the continuous filament 131 can be drawn by the deposition head 122 with minimal effort.

The assembly 125 comprises a filament inlet 210 for receiving the continuous filament 131 from a filament source 130, a filament outlet 220 for receiving the continuous filament from the filament inlet, and a filament track 230. The continuous filament 131 forms a filament loop 240 within the accumulator assembly, and the filament track 230 defines at least a part of an inner boundary and an outer boundary of a circuitous filament route between the filament inlet 210 and the filament outlet 220, the filament loop following the filament route.

Figure 4A:
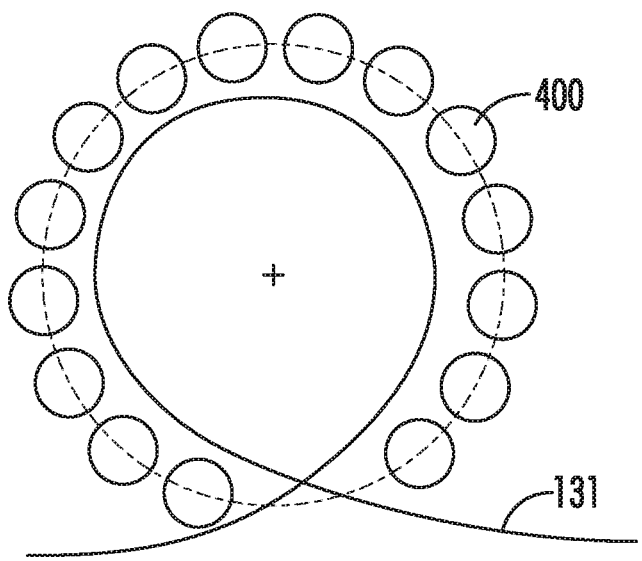
FIG. 4A depicts an implementation of rollers in a filament accumulator assembly 125.

The continuous filament loop 240 is formed in the continuous filament 131 between where the continuous filament exits the filament inlet 210 and where it enters the filament outlet 220. The filament track 230 bounds the circuitous filament route at least some points along the route, and the filament route may be, for example, substantially circular, as shown in FIGS. 2, 3A, and 3B. Further, as shown in FIG. 4A, in order to reduce friction of the filament 131 in cases where the filament rubs against inner or outer boundaries of the circuitous filament route, the boundaries may be made of a series of rollers 400 spaced such that the filament cannot inadvertently pass between them and exit the designated route. In some embodiments, the filament track 230 may define the inner and outer boundary of the circuitous filament route at only one point along the route, as shown and described below in relation to FIG. 5.

The filament track 230 bounds the filament loop 240 across a range of potential diameters for the filament loop. Accordingly, the range of potential diameters of the filament loop 240 range from a maximum diameter 250, approximated in FIG. 3A, to a minimum diameter 260, approximated in FIG. 3B, and the various diameters all fall within the filament route bound by the filament track 230. Typically, the filament loop 240 will take the form of a circle, or will approximate a circle. However, it will be understood that the diameter means a distance from one side of the path or loop to the other, and while the path will typically take a substantially circular form, the term diameter is used in the same way even if the path or loop takes a different shape.

In locating the filament accumulator assembly 125 with respect to the deposition head 122, the accumulator assembly may be mounted to a fixation point directly on the deposition head, or it may be mounted on a support along with the deposition head. In some embodiments, the accumulator assembly 125 may be mounted adjacent the deposition head 122 at the robot's wrist such that the filament track 230 encircles the robot wrist. In other embodiments, the accumulator assembly 125 may also reside further upstream, such as mounted to a support on the ceiling, such that the filament path between the accumulator and the deposition head imparts a sufficiently small amount of friction on the filament. Regardless, the accumulator assembly 125 is positioned such that the deposition head 122 can draw the continuous filament 131 from the filament outlet 220 of the accumulator assembly 125 while the deposition head 122 deposits the continuous filament onto, for example, object 151. Accordingly, while the deposition head 122 draws the filament 131, the length of filament between the filament outlet 220 and the deposition head 122 is provided with a substantially known velocity, or speed, referred to herein as the outlet speed. In some embodiments, the outlet speed of the continuous filament could depend on what the deposition head 122 is doing at any given time, such that it could vary over time. Accordingly, the outlet speed may be substantially known because it is determined by the speed at which the deposition head 122 draws the filament 131 from the filament outlet 220.

In embodiments in which the assembly accounts for a variation in upstream tension, instead of, or in combination with, a speed mismatch, the assembly may provide an outlet tension that is regulated to be substantially reduced, such as a tension on the order of 0.2 Newtons. Such a reduced outlet tension allows the characteristics of the continuous filament 131 at the deposition head 122 to be controlled substantially by the deposition head itself.

The length of the continuous filament 131 between the filament source 130 and the filament inlet 210 of the tensioning assembly 125 may have a wide range of speeds, referred to herein as the inlet speed, which may differ from the outlet speed. For example, while the outlet speed may depend on the rate at which the deposition head 122 draws the continuous filament 131 from the filament outlet 220, the inlet speed may depend on a speed at which the continuous filament is provided from a filament source 130, such as a spool. Such a spool may be driven by a motor, and may not be able to change speed as consistently or as quickly as the deposition head 122.

Where the inlet speed does not correspond to the outlet speed, such a mismatch is accounted for by the accumulator assembly 125. In such a case, the accumulator assembly 125 manages excess material encountered due to the speed mismatch, as discussed below. Accordingly, it will be understood that while reference is made simply to "speed mismatch," the issues described and addressed herein are exacerbated when such a mismatch exists over time, thereby increasing the amount of slack gained or lost that must be accounted for.

It will be understood that while this disclosure describes the accumulator assembly 125 and its functionality in terms of inlet and outlet speeds, it similarly accounts for a tension mismatch between the filament inlet 210 and the filament outlet 220. Accordingly, the assembly 125 described could similarly be considered a filament tensioning or tension control assembly due to its role in controlling and reducing tension at the filament outlet by accumulating slack or letting out slack when encountering a tension mismatch between the filament inlet 210 and the filament outlet 220. This may be particularly relevant when the continuous filament 131 is drawn from an unpowered spool as a filament source, as such a scenario would result in tension in the line between the filament source 130 and the filament inlet 210 determining how quickly the continuous filament will pass through the filament inlet.

During normal operating procedures, when the inlet speed is substantially similar to the outlet speed, or is at a standard operating inlet speed, the filament loop 240 is approximately midway between the maximum diameter 250 and the minimum diameter 260 within the filament path 230. In some embodiments, the inlet speed and outlet speed would be expected to be similar, while in other embodiments, the outlet tension may vary as needed by the deposition head 122, while the inlet speed may be held at a constant standard operating inlet speed.

The term standard operating inlet speed is used to refer to a tension that would be expected at the inlet 210 during normal operation of the accumulator assembly 125.

When the inlet speed is greater than the outlet speed, the filament loop 240 may slowly expand and approach the maximum diameter 250. This may occur, for example, where the filament source 130 is a spool carrying rotational inertia after the deposition head has slowed or stopped drawing filament 131 from the tensioning assembly 125. This may also occur where the inlet speed is at the standard operating inlet speed and the deposition head 122 has slowed down or stopped. In such a scenario, the filament loop 240 may expand to account for uptake of slack from the spool 130.

Similarly, if inlet speed is lower than outlet speed, the filament loop 240 may slowly contract and approach the minimum diameter 260. This may occur, for example, wherein the filament source 130 is a spool and the deposition head has started from a rest position and a motor driving the filament source requires time to approach the standard operating inlet speed due to the rotational inertia of the spool. Alternatively, an improper inlet speed may be indicative of an unexpected error preventing the dispensing of filament 131 to the tensioning assembly 125. Further, an improper inlet speed may be indicative of wear on parts of the system, such as wear on drive wheels engaging the filament at the spool. Such wear would result in a decreased radius for the drive wheels, resulting in a reduced feed rate. Improper outlet speed could similarly be caused by drive wheel wear in the deposition head.

Additional factors may result in, or combine to result in, a mismatch between the inlet speed and the outlet speed. For example, as filament 131 is removed from a spool functioning as a filament source 130, the diameter of the filament on the spool will shrink. If this is not fully accounted for by calculating the current diameter of the spool at any given time, a single rotation of the spool will result in less filament 131 fed to the filament inlet 210 at a slower speed.

System parameters may similarly vary based on the physical characteristics of the filament 131 itself, such that different filament materials may be provided with different expected filament loop 240 diameters, and in turn, a different filament track 230 defining different circuitous filament routes.

If a speed mismatch is outside the expected range, or continues for longer than an expected amount of time, the filament loop 240 diameter may exceed the range allowed for by the filament track 230. Accordingly, the filament accumulator system 125 may include an inner limit switch 270 and an outer limit switch 280, and tripping either switch indicates a speed mismatch between the inlet speed and the outlet speed outside of an expected range or an error, and such signal may be transmitted to the controller 101 which may turn initiate corrective action. The limit switch may be, for example, a mechanical or optical switch. Accordingly, when the diameter of the filament loop 240 exceeds the filament track 230 range, the filament loop 240 will trip the outer limit switch 280 which may stop the system or may implement some process to correct the speed mismatch detected. For example, if the filament loop 240 is at its maximum diameter, the speed of a motor driving a spool at the filament source 130 may be reduced or stopped until the diameter of the filament loop 240 has been sufficiently reduced.

Similarly, if the diameter of the filament loop 240 shrinks to the inner boundary of the filament path 230 range, the filament loop will trip the inner limit switch 270, similarly implementing a process to correct the speed mismatch. For example, if the filament loop 240 is at its minimum diameter, the speed of a motor driving a spool at the filament source 130 may be increased until the diameter of the filament loop 240 has sufficiently increased. Alternatively, or in combination with this change, the speed at which the filament deposition head 122 draws filament 131 from the filament outlet 220 may be reduced.

Figure 4B:
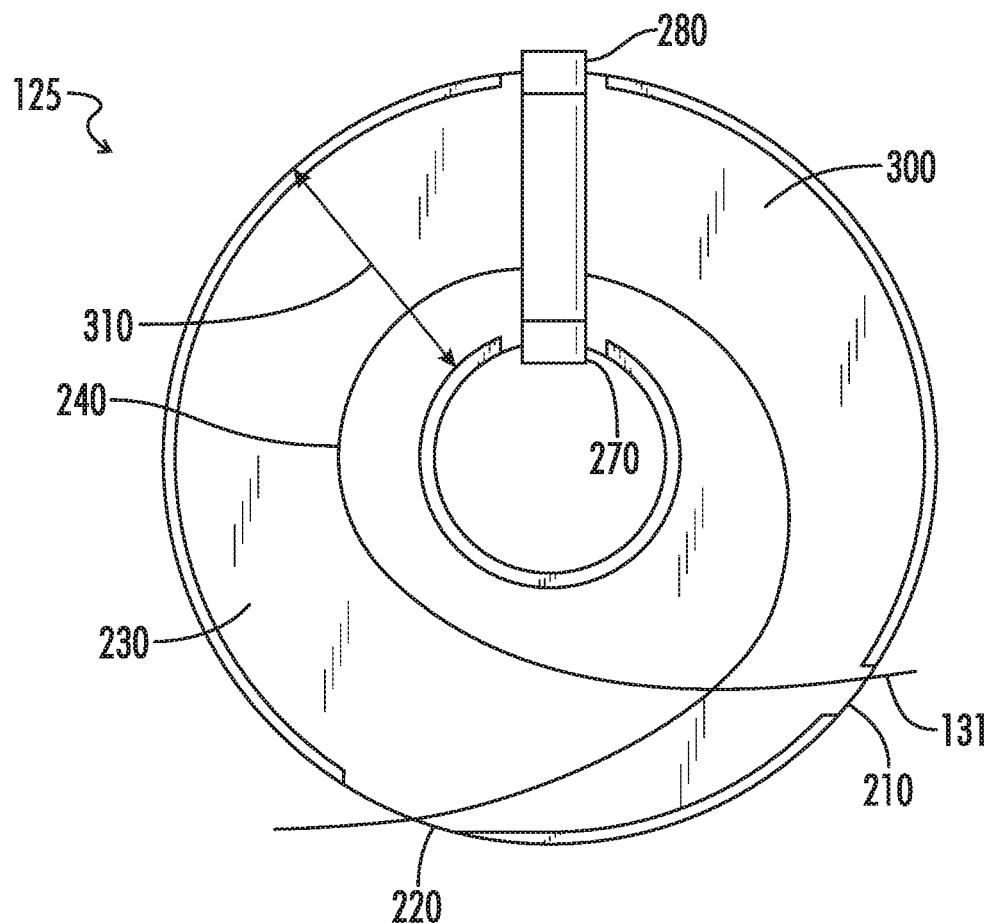
FIG. 4B depicts schematically an interior of the filament accumulator assembly 125.

In the embodiment shown, the filament accumulator system 125 is provided within a housing 290 having an interior space 300. Such an interior space 300 is shown schematically in FIG. 4B, and contains a filament track 230 with a width 310 adapted to correspond to an expected size range of the filament loop 240. This may vary depending on the material forming the filament loop 240. However, when the tensioning system 125 is designed to work with a specific known filament material, and does not require adjustability, the filament path 230 may comprise the majority of the interior space 300 of the housing 290. Accordingly, the continuous filament 131 extends from the filament inlet 210 to the filament outlet 220 by way of a circuitous filament route defined by the filament path 230.

In other embodiments, the filament path 230 may be adjustable to account for different materials having different stiffnesses. In such an embodiment, the limit switches may be adjustable in order to modify boundaries of a portion of the interior space 300 to be used as the filament path 230. Further, the housing 290 itself may be modified to account for a different material, such as in order to allow for a larger filament loop 240. Further, the housing or device may be modified for processes that require a larger feed mismatch margin, and therefore require a greater ability to accumulate filament. Such a scenario may be may be accounted for by providing multiple stacked accumulator segments, each of which would duplicate the ability to accumulate slack. In such an embodiment, it may be necessary to provide a motor in between each accumulator segment to properly transmit speed or tension between accumulator sections.

Figure 5:
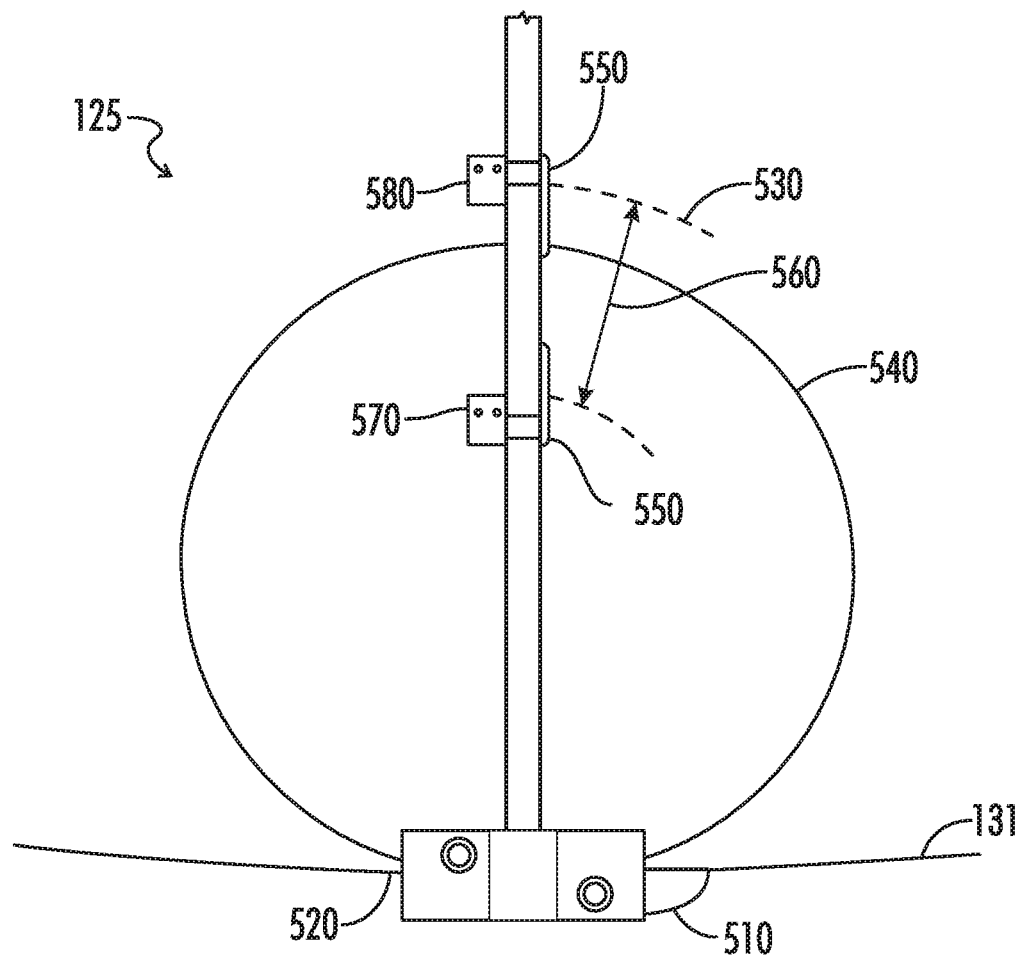
FIG. 5 depicts schematically components of the filament accumulator assembly 125.

FIG. 5 depicts schematically components of the filament accumulator assembly 125. As shown, a housing is not always required, and the accumulator assembly 125 may instead comprise a filament inlet 510, a filament outlet 520, and a circuitous filament route defined by and bound by a filament track 530 between the inlet and outlet providing a range of potential diameters for a filament loop 540 contained therein.

As shown, the filament track 530 may be defined at a limited number of location, such by a pair of guides 550. As shown, those guides 550 may contain an outer limit switch 580 and an inner limit switch 570. Because filaments will naturally take a rounded form for the filament loop 540, a minimal number of restraining points are required to form the filament path 530 having a width 560. As such, in the example shown, the filament track 530 defines the inner boundary and the outer boundary of the circuitous filament route at only one point along the route, and the route is further defined at the filament inlet 510 and the filament outlet 520. It will be understood that, in light of the minimal locations at which the boundaries of the circuitous filament route is physically defined, the embodiment shown in FIG. 5 may require more manual loading procedures than the other embodiments described herein.

Figure 6A:
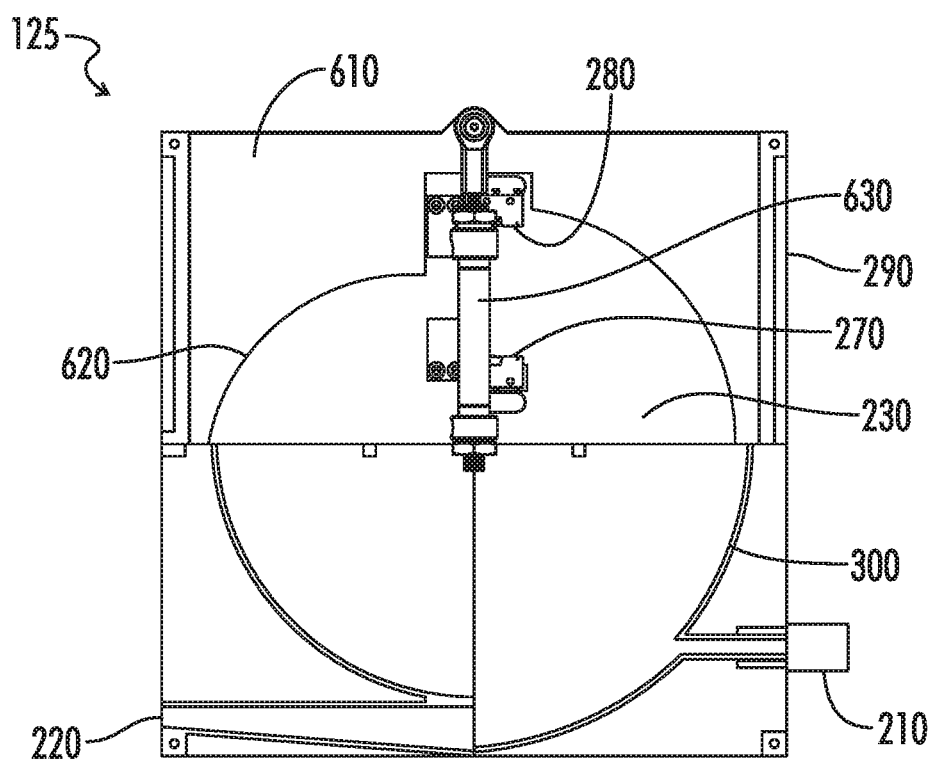
FIGS. 6A and 6B depict the filament accumulator assembly 125 in a first and second configuration.
Figure 6B:
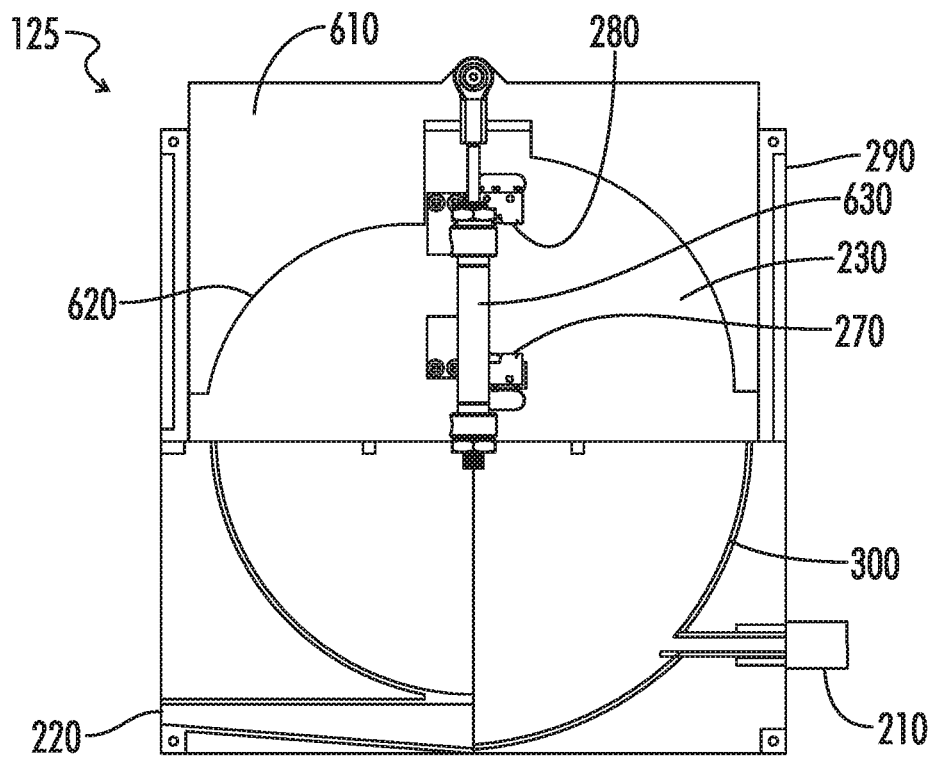
Figure 7:
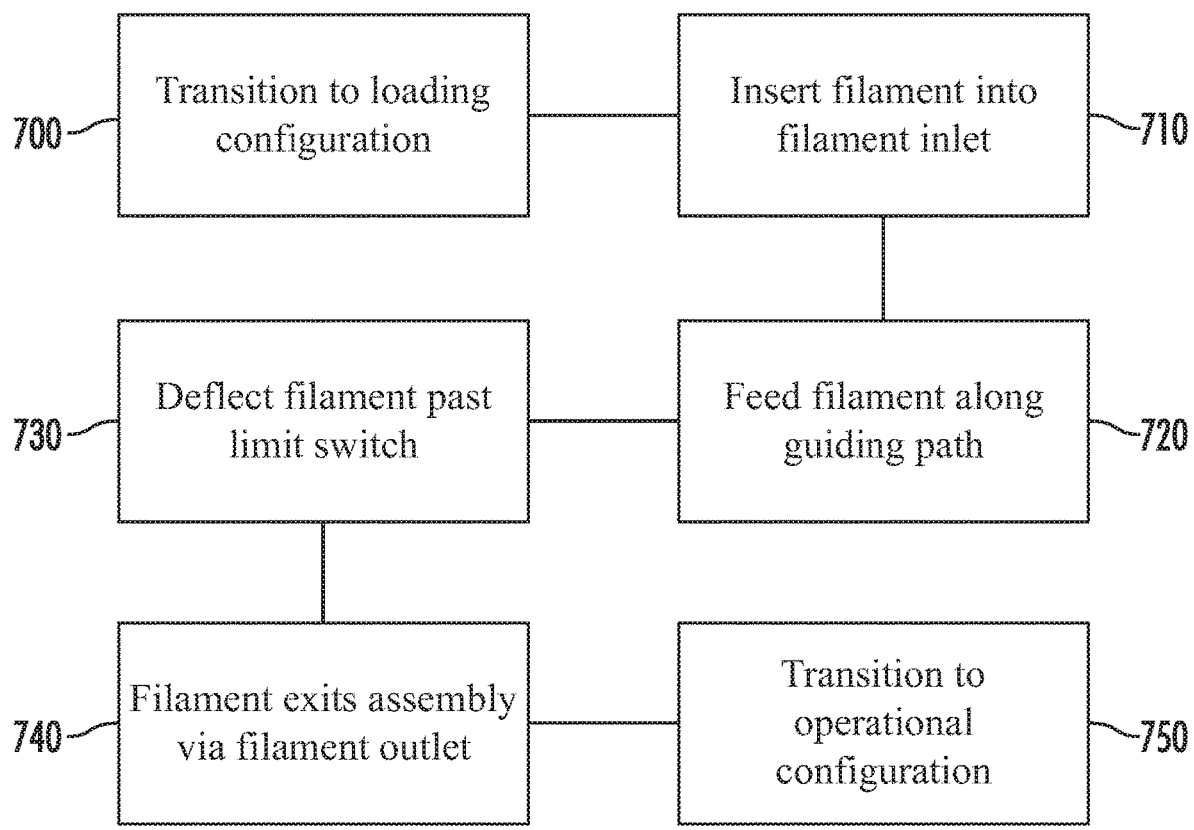
FIG. 7 is a flowchart depicting a method for loading a filament accumulator assembly 125.

FIGS. 6A and 6B depict the filament accumulator tensioning assembly 125 of FIG. 1 in a first and second configuration, and FIG. 7 is a flowchart depicting a method for loading the filament accumulator assembly 125. As shown, the housing of the assembly includes a movable insert 610 that forms a boundary of the interior of the housing. The movable insert 610 may also form, in part a boundary of the filament path 230. A portion of the movable insert 610 that forms part of the boundary of the filament track may be a guiding path 620 for use in loading the accumulator assembly 125.

In order to load the accumulator assembly 125 with a continuous filament 131, the filament must be threaded through the filament inlet 210, travel along the filament path 230, and pass through the filament outlet 220. However, many embodiments of the assembly 125 may include obstructions in the filament path. For example, limit switch 280 may extend from a side of the filament path 230 and prevent the filament from following the path to the filament outlet 220. Accordingly, the movable insert 610 is movable between a loading configuration, shown in FIG. 6A and an operational configuration, shown in FIG. 6B.

When in the loading configuration, the movable insert 610 creates a guiding path 620 that forces a filament 130 following the path to pass adjacent the limit switch 280, which would otherwise obstruct its path. Once past the limit switch 280, the filament 131 would be directed by the interior 300 of the housing 290 that forms the boundary of the filament track 230 towards the filament outlet 220.

After loading, the movable insert 610 is moved by actuator 630 to its operational configuration, thereby moving the guiding path 620 so that it does not obstruct normal operation of the tensioning assembly 125.

In some embodiments, instead of providing a movable insert 610, the outer limit switch 280 is removable from the interior 300 of the housing 290 so that the continuous filament 131 can be inserted along the filament track 230. In such an embodiment, the removal of the limit switch 280 transitions the assembly 125 to the loading configuration, and the outer limit switch 280 may then be reinserted after loading the continuous filament 131.

Accordingly, in loading the accumulator assembly 125, a user, or the spool system under control of a computer, such as controller 101, would first transition the assembly to a loading configuration (700) and would then drive the continuous filament 131 into the filament inlet 210 (at 710). The continuous filament 131 would then be forced along a boundary of the filament track 230 until encountering the guiding path 620 (at 720).

The continuous filament 131 then follows the guiding path 620 along a radius smaller than the operational filament path 230 until passing the limit switch 280 (at 730), after which time the filament continues along the filament path 230 until exiting the tensioning assembly 125 at the filament outlet 220 (at 740).

The movable insert 620 is then transitioned to its operational configuration (750) and the continuous filament 131 may be tensioned by the deposition head 122.

In some embodiments, multiple accumulator assemblies 125 may be used in series, such that a filament inlet 210 of a first accumulator draws a continuous filament 131 from a filament outlet 220 of a second accumulator. In such an embodiment, at least one of the individual filament accumulators 125 may be provided with a motor at its inlet or outlet in order to regulate the passage of the filament from the first accumulator to the second accumulator. While these motors are not necessarily required during loading processes, they may ease the initial transition from assembly to assembly, due to large amounts of friction that may need to be overcome.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A filament accumulator for absorbing a speed mismatch between filament provided from a filament source and filament used at a filament deposition head comprising:
    a continuous filament forming a filament loop;
    a filament inlet for receiving the continuous filament from a filament source;
    a filament outlet for receiving the continuous filament from the filament inlet, the filament loop being a loop in the continuous filament between the continuous filament exiting the filament inlet and entering the filament outlet;
    a filament track defining at least part of an inner boundary and an outer boundary of a circuitous filament route between the filament inlet and the filament outlet, the filament loop being bound by the filament track; and
    a housing, an interior of the housing defining at least part of the filament track,
    wherein the filament loop has a diameter that varies across a range of potential diameters within the filament track,
    wherein the filament deposition head draws the continuous filament from the filament outlet at a first speed,
    wherein the filament inlet receives the continuous filament from the filament source at a second speed,
    wherein a mismatch between the first speed and the second speed results in a change in the diameter of the filament loop, and
    wherein the interior of the housing further comprises a guiding path that directs the continuous filament past an outer limit switch when loading the filament.

2. The filament accumulator of claim 1, further comprising at least one limit switch at either the inner boundary or the outer boundary, wherein the limit switch is activated when the filament loop is at a minimum or maximum potential diameter.

3. The filament accumulator of claim 2, wherein the at least one limit switch is movable to define a different range of potential diameters for the filament loop in order to account for filament materials having different stiffnesses.

4. The filament accumulator of claim 2, wherein the at least one limit switch is activated when the filament loop is at its minimum diameter, and wherein the limit switch sends a signal to the filament deposition head to stop drawing filament from the filament outlet when activated.

5. The filament accumulator of claim 2, wherein the at least one limit switch is activated when the filament loop is at its minimum diameter, and wherein the limit switch, upon activation, sends a signal to start or increase a speed of a motor at the filament inlet or at the filament source for increasing a speed at which the continuous filament is received.

6. The filament accumulator of claim 2, wherein the at least one limit switch is activated when the filament loop is at its maximum diameter, and wherein the limit switch, upon activation, sends a signal to slow down or stop a motor at the filament source.

7. The filament accumulator of claim 1, wherein the guiding path is removable, such that it may be used for loading the continuous filament and removed for use of the filament accumulator.

8. The filament accumulator of claim 1, further comprising at least one limit switch at the outer boundary, wherein the limit switch is activated when the filament loop is at a maximum potential diameter, and wherein the limit switch is removable from the filament track so as not to obstruct the continuous filament during loading of the filament loop.

9. The filament accumulator of claim 1, wherein the first speed is unrelated to or imperfectly matched to the second speed.

10. The filament accumulator of claim 9, wherein the first speed is controlled by the deposition head.

11. The filament accumulator of claim 1 further provided with a second filament accumulator, wherein the filament inlet of the first filament accumulator receives the continuous filament from the filament outlet of the second filament accumulator, and wherein the deposition head draws the continuous filament from the filament outlet of the first filament accumulator and the filament inlet of the second filament accumulator receives the continuous filament from the filament source.

12. The filament accumulator of claim 1, wherein at least a portion of the interior of the housing comprises a plurality of rollers for reducing friction.

* * * * *